United States Patent Office 3,725,095
Patented Apr. 3, 1973

3,725,095
FOAMED ALKALI SILICATE BINDER
COMPOSITIONS
Verne Wesley Weidman and Paul C. Yates, Wilmington, Del., assignors to E. I. du Pont de Nemours and Company, Wilmington, Del.
No Drawing. Continuation-in-part of abandoned application Ser. No. 779,275, Nov. 26, 1968. This application Apr. 1, 1971, Ser. No. 130,469
Int. Cl. C04b 35/16
U.S. Cl. 106—75      19 Claims

ABSTRACT OF THE DISCLOSURE

This invention relates to stable shapeable aqueous siliceous foams prepared from an alkaline ionic silicate, e.g., sodium silicate, a cationic surface active nitrogen-containing "onium" compound and optionally colloidal amorphous silica sols. The foam can contain a filler material such as perlite and can also contain a latent gelling agent such as formamide which hydrolyzes to aid in setting the foam. The foam can also be contacted with an acidic acting gas, e.g., carbon dioxide which aids in the foam setting mechanism.

CROSS REFERENCE TO RELATED APPLICATION

This application is a continuation-in-part of our application S.N. 779,275 filed Nov. 26, 1968, now abandoned.

BACKGROUND OF THE INVENTION

A number of references teach foamed silicate compositions. Dess, U.S. 3,136,645 teaches silicate foams containing a surface active agent and the reaction product of a base and sodium fluosilicate and silicon. Thus, this foam is setting at the same time it is formed. It is not simultaneously stable and shapeable. Similarly, the foam taught in Weldes et al., U.S. 3,419,495 is formed and set simultaneously. However, where Dess taught a basic system, Weldes et al. relies on an acidified system. An acidified silica sol reacts with a metal carbonate releasing carbon dioxide as a foaming agent and at the same time forming a metal silicate compound, thus setting the foam. Like the teaching of Dess, Weldes et al. teaches that surface active agents may be added to insure more uniform foams. However, neither patent teaches a method of making foams which are shapeable and stable.

Gajardo et al., U.S. 3,208,813 has as its object a stable shapeable silicate foam but fails to recognize the inventive feature of this invention, that foam stability is enhanced by the reaction product of silicate and a cationic surface active agent. In fact, Gajardo et al. specifically states that a cationic surface active agent cannot be used in the foams taught therein.

Finally, Quinn et al., U.S. 3,322,498, teaches the utility of cationic sufactants in producing silica lamellae by a process wherein the surfactant is added to silica which is generated by acidifying a silicate solution. However, the foams of Quinn et al. are not stable and shapeable for extended time periods because their silicate concentration is too low (less than 3% $SiO_2$) and because silica "crystals" grow in the bubble walls as a result of the addition of acid. This is clearly shown by the fact that, in about three hours, the silica "crystals" have grown and separated from the fluid to such an extent that the free fluid can be filtered off.

SUMMARY OF THE INVENTION

This invention relates to stable, shapeable, aqueous siliceous foams, with a pH of at least 9, stabilized by the reaction product between a source of reactive silica and a surface active cationic, nitrogen-containing "onium" compound having at least one but no more than two alkyl hydrocarbon chains of 8–24 carbon atoms. The source of reactive silica is preferably in the form of dissolved silicate anions, but may also be present, in part, as reactive silanol (—SiOH) groups on the surface of colloidal silica having an average particle size of 5 to 200 millimcrons. The total concentration of reactive silica plus nonreactive silica in the foams is at least 8% by weight calculated as $SiO_2$. The dissolved silicates, which are considered to be part of the reactive silica, comprise at least one dissolved alkaline ionic silicate selected from the group of lithium silicate, sodium silicate, potassum silicate and silicates of monovalent organic bases, the base having a basic dissociation constant at 25° C. greater than $10^{-2}$. The amount of reactive silica present on the surface of colloidal silica is determined by the formula $S=0.08A=218/D$, where S is the percent of the total colloidal silica which is on the surface and available for reaction, A is the specific surface area of the colloidal silica in square meters per gram, and D is the average diameter of the colloidal silica particles in millimicrons. Also included in the total silica content of the foams is the nonreactive inner portion of the colloidal silica particles. The foam composition has a mole ratio of colloidal silica to silicate ion of 0:1 to 99:1.

DESCRIPTION OF THE PREFERRED EMBODIMENTS

The compositions of this invention are stable, fluid, plastic foams, and products derived therefrom, containing as an essential foaming, foam stabilizing, and binding ingredient, a reaction product between dissolved alkaline ionic silicate, colloidal silica when present and a long chain nitrogen-based "onium" compound. Total $SiO_2$ content in the wet foams must be at least 8% by weight, of which $SiO_2$ at least 1% must have been derived from the alkaline ionic silicate. The "onium" compound must be present at from 0.002–0.05 mole per mole of reactive silica present, the reactive silica being assumed to be all of the added alkaline ionic silicate plus the surface silanol groups of the colloidal silica which can be calculated from the specific surface of the colloidal or the average diameter of the silica particles by the equation $$S=0.08A=218/D$$

where S is the percent of the total silicon atoms in the colloid which are in the surface of the particles and therefore reactive, A is the specific surface area of the colloidal silica, and D is the average diameter of the colloidal silica particles. The pH of the composition must be greater than 9.

Although the exact nature of the foam stabilizing entity has not been determined, it is clear that a reaction product between the silicate anions and the onium surface active cations is involved. This shown first by the fact that in the absence of the silicate anions, the quaternary ammonium or onium compounds cause a foam or a froth to form, but this, like most soap foams, is unstable and decays rapidly once beating is stopped.

It is also known that a reaction occurs between the alkaline ionic silicates and the onium surfactant cations because when these materials are put together without foaming, a white insoluble precipitate is formed. It is known that the active ingredient which stabilizes the foam does involve the silicate anions, since experiments have shown that if the pH is dropped below 9 and held there for any appreciable period of time, even a few minutes, or if a latent acid such as ethylene carbonate is mixed with the composition of the invention and allowed to react for a few minutes, the system will no longer foam satisfactorily. Thus even a moderate degree of polymerization of the silicate anion before foaming occurs results in a structure which can no longer be foamed.

It is felt that the foams of the invention comprise foam walls formed of micelles of the cationic surface active agent, bonded ionically to micelles of the silicate anions. The inability to foam compositions which have undergone any appreciable degree of silica polymerization makes it seem likely that these micellar complexes between the surfactant cations and the silicate anions have an essentially two-dimensional structure, since formation of a three-dimensional polymer from the silicate anions by neutralization rapidly kills the ability of this mixture to foam satisfactorily. This micelle complex, therefore, is thought to be a two-dimensional array of the surfactant cations and the silicate anions which stabilizes the walls of the foam, and yet because it is not chemically crosslinked, gives the foam its fluid and plastic character.

Once the foam is formed and, if desired, mixed with various fillers, it is possible to set it rapidly, either chemically or thermally. This can be done by exposing the foamed structure to an acidic gas such as carbon dioxide or sulfur dioxide, for example, or by the addition of any of a number of latent gelling agents which can then be set either by application of heat or simply by the passage of time. These latent gelling agents are compounds such as amides, esters, acid anhydrides, and the like, and the use of such compounds will be discussed in greater detail below. Examples of suitable compounds will also be given in later sections of this application.

It should be noted that in contrast to the products of the prior art, the foams of this invention have exceedingly fine bubbles, usually less than a tenth of a millimeter in diameter and that they are sufficiently stable that they do not have to be instantly set, but can be mixed with other materials to be bonded by them over convenient periods of time. Because of this fine-pored foam structure, exceedingly light weight, strong, and water-resistant compositions can be prepared from the foams of the invention.

The properties of bodies, prepared by using the foams of the invention as binding agents, reflect the unique foam structure achieved in the liquid foams of the invention. This is shown by the combination of high water resistance, low density and high strength which has not previously been achieved by the compositions of the art. The fluid, plastic, chemically settable foams of the invention can be mixed with almost any inert particulate material and then set either chemically or thermally as noted above, to produce light weight, strong, bonded structures. Because of their high binding capacity the amount of particulate material which can be bonded by the compositions of the invention is very great, and appreciable strength is retained even in bodies which contain as much as 15 parts by weight of dry particulate material per part by weight of one of the wet foam binders of the invention. Thus, the positive participation of the silicate anions in forming the structure of the foam imparts unique characteristics to the compositions of the invention not shared by the anionic and nonionic silicate foams of the prior art.

Since the silicate anions are actually part of the foam structure, it is not necessary to stabilize the wet foam by the addition of other particulate materials. The compositions of this invention are sufficiently stable that they can be dried as such, or preferably chemically set and then dried, giving thereby a fine-pored, pure silicate foamed structure. If the foams have been chemically neutralized prior to drying, an amorphous silica-walled foam can be obtained without any of the fillers required in prior art products.

Alkaline ionic silicate

The alkaline ionic silicates of the invention are water-soluble silicate compounds of strong monovalent bases. Included among these are the silicates of lithium, sodium, and potassium, as well as the silicates of strong monovalent organic bases, such as tetramethylammonium, tetraethanolammonium and guanidium hydroxide. These bases are all characterized in that they have basic dissociation constants at 25° C. in excess of $10^{-2}$. The silicates of these bases are further characterized in that they are water-soluble compounds which are more or less completely dissociated into their respective cations and anions when dissolved in aqueous solutions.

Such alkaline, essentially ionic silicates can be prepared over a range of mole ratios of silicate anions to alkaline monovalent cations. Thus, if we consider the ratio of silicate anions to the anhydrous basic oxide, for example the mole ratio of $SiO_2$ to $Na_2O$, suitable ratios are between about 2 and 5. It is possible to prepare compositions in which the molar ratio of silica to alkaline oxide is in excess of 5, and such compositions are also useful for the purposes of this invention. For example, a composition which has an overall mole ratio of 10 moles of silica to 1 of alkaline oxide is suitable in this invention. Such compositions, however, actually consist of mixtures of colloidal silica with alkaline ionic silicates. In general, the highest mole ratio of alkaline, primarily ionic, silicates is approximately 5, and in a composition having a ratio such as 10, approximately half of the silica will be in the form of alkaline ionic silicate, with the remainder being present as colloidal amorphous silica particles of much higher molecular weight.

It is the alkaline ionic silicate of the compositions of this invention which imparts the capability of rapid chemical set, and leads to their high binding capacity.

Thus when colloidal silica is included in the mixture, it will always be necessary to have at least one percent of the total silica in the composition comprising an alkaline ionic silicate of the invention. The silica-silicate mixtures of this invention can have a mol ratio of colloidal silica to silicate ion of from 0:1 to 99:1 and preferably from 0:1 to 50:1, the total silica-silicate content of the wet foam being at least 8% by weight. Naturally when the mole ratio is 0:1 only the alkaline ionic silicate is utilized in the foam. For foam uses where a high degree of stability is desired, the ratio of colloidal silica to silicate ion should be from 1.5:1 to 50:1.

Colloidal amorphous silica

The colloidal amorphous silica to be used is preferably discrete, stable colloidal silica particles in the general size range of from about 5 to about 200 millimicrons. As the particle size of the colloidal amorphous silica increases, the amounts which can be mixed with the compositions of the invention also increases, since the stability of alkaline ionic silicates and colloidal silica mixtures increase with increasing colloidal silica particle size.

The negatively charged colloidal silica particles suitable for inclusion in this invention comprise silica having an ultimate particle size of less than 200 millimicrons, and preferably less than 50 millimicrons. Particles at least 5 millimicrons in diameter are preferred, however, since otherwise, the rate of depolymerization of such very fine particles when mixed with the alkaline ionic silicates of the invention may become significant and cause problems of premature gel formation and lack of stability.

Colloidal amorphous silica sols suitable for use in the compositions of the invention can be prepared by a number of methods well known to the art and are commercially available in a variety of forms. Representative of suitable commercially available colloidal silicas are powders such as Cabot Corporation's "Cab-O-Sil"; Columbia Southern Company's "Hi-Sil"; PPG Company's "Arc Silica 800"; J.N. Huber Company's "Zeo 100"; and Philadelphia Quartz Company's "Quso G–20." Such particulate amorphous silica powders can be prepared as stable colloidal silica aquasols, by the addition of suitable amounts of stabilizing bases coupled with vigorous agitation. Techniques for preparing such aquasols from the starting powders are given in the literature of the above companies, for example, in trade literature by the Cabot Corp. in connection with preparing such dispersions from "Cab-O-Sil."

Rather than starting with a dry dispersible amorphous silica powder, it is also possible to start with any of a variety of commercially available colloidal amorphous silica aqueous dispersions. These include, for example, "Syton" Colloidal Silica Aquasols produced by the Monsanto Chemical Co.; Nalco's, "Nalcoag" colloidal silica aquasols; and Du Pont's "Ludox" HS, "Ludox" LS "Ludox" AS, "Ludox" AM, "Ludox" SM, and "Ludox" TM colloidal silica aquasols. Although such aquasols vary in particle size and in the type and amount of stabilizing base, they are all suitable for use with the compositions of this invention.

In preparing mixtures of colloidal silica aquasols with the alkaline ionic silicates of the invention, certain precautions have been found necessary. Generally speaking, alkaline lithium silicates are compatible with virtually any particle size colloidal amorphous silica sol, and in any proportions. This tends also to be true of potassium silicates, tetramethylammonium silicates and tetraethanolammonium silicates. Sodium silicates of mole ratios of silica to $Na_2O$ greater than about 4 are also generally compatible with a wide range of particle sizes and concentrations of colloidal amorphous silica, but sodium silicates having lower ratios than this sometimes gel the colloidal amrophous silica, particularly if high concentrations of colloidal amorphous silica and small particle sizes are employed. Guanidine silicate shows somewhat the same problem. This can often be minimized by diluting the colloidal amorphous silica with water or by selecting a larger particle-sized colloidal amorphous silica. In some instances, it may be desirable to add a small additional amount of stabilizing base, such as sodium hydroxide, guanidine hydroxide, etc. to the colloidal amorphous silica sol prior to adding the alkaline ionic silicate. It is usual desirable in doing this to add an amount of strong base which approximately equals the molar concentration of surface silanol groups of the amorphous silica sols.

Foaming agents

The foaming agents of this invention consist of long-chain onium compounds. By "long-chain onium compounds" is meant those cationic nitrogen-based onium compounds containing at least one but not more than two alkyl chains of more than 7 carbon atoms. Such compounds are described fully in the Encyclopedia of Chemical Technology, by Kirk & Othmer, Interscience Encyclopedia Inc. (1952) in vol. 9, pp. 592–593. Representative of these compounds are substituted ammonium, imidazolinium, hydroxylammonium and guanidinium compounds in which the substituents are hydrogen, straight- or branched-chain aliphatic groups of 1 to 24 carbon atoms, cycloalkyl, aryl, and alkyl substituted aryl groups. The nitrogen can be part of the ring in a heterocyclic structure.

Representative of these compounds are: caprylyl trimethyl ammonium chloride (Aliquat 2); oleyl trimethyl ammonium chloride (Aliquat 11); oleyl-linoleyl trimethyl ammonium chloride (Aliquat 15); dilauryl dimethyl ammonium chloride (Aliquat 204); lauryl heterocyclic tertiary amine (Amine C); cetyl dimethyl ethyl ammonium bromide (Ammonyx DME); cetyl dimethyl benzyl ammonium chloride (Ammonyx T); lauryl trimethyl ammonium chloride (Arquad 12–50); cetyl trimethyl ammonium chloride (Arquad 16–50); stearyl trimethyl ammonium chloride (Arquad 18–50); quaternized 2-amino pentadecane (Arquad L–15); dicoco dimethyl ammonium chloride (Arquad 2C–50`, N-cetyl ethyl morpholinium ethosulfate (Atlas G 263); alkenyl dimethyl ethyl ammonium bromide (Barquat OE–50); lauryl isoquinolinium bromide (Barquat IB–75); myristyl dimethyl benzyl ammonium chloride (BTC 1750); stearamido propyl dimethyl B-hydroxyethyl ammonium phosphate (Catanac SP); tetradecyl pyridinium bromide (Fixanol VR); heptadecenyl imidazolinium bromide (Intexan HB–50); quaternary substituted imidazoline of oleic acid (Monaquat OIBC); substituted imidazoline of myristic acid (Monazoline M); coco fatty dialkyl benzyl ammonium chloride (Quatrene CB); fatty glyoxalidinium chloride (Quatrene O–56); soya fatty dialkyl benzyl ammonium chloride (Quatrene SFB); 1-hydroxyethyl 2-heptadecenyl imidazoline hydrochloride (Romine BTQ); and lauryl dimethyl benzyl ammonium chloride (Vantoc CL).

The compositions of this invention must contain a ratio of the mols of onium surfactant foaming agent to moles of reactive silica of from 0.002 to 0.05. Below the critical lower limit, the stability of the foams is not satisfactory and the foams collapse rather rapidly. The upper limit is posed by considerations of practicality, since the presence of large excess of foaming agent serves no useful purpose.

Use of the cationic surface active onium foaming agent in the silicate foams of this invention gives the foams surprising stability while not removing their shapeability. These foams may be shaped for up to 4 hours after forming. The water in the foam can completely evaporate without causing collapse of the foams. If the foams are formed in an atmosphere where drying is prevented or is very slow they remain shapeable and dimensionally stable for extended periods. These foams remain stable even when inert fillers are incorporated.

The moles of foaming agent to be employed is not solely governed by the moles of silica present in the form of alkaline ionic silicate if colloidal amorphous silica is also present. When this is so, it is desirable to increase the amount of surface active agent in proportion to the surface area and the quantity of amorphous silica present. This is because a competition exists between the alkaline ionic silicate and the amorphous silica for the absorption of foaming agent.

In general, the additional amount of surface active agent which should be included to react with the amorphous silica is proportional to the total number of SiOH groups present on the surface of the colloidal silica. This can be computed by multiplying the specific surface area in square meters per gram of the colloidal amorphous silica by its concentration, and then by multiplying this by the number of silanol groups (Si-OH groups) per unit area of surface. It is generally accepted that approximately 8 silanol groups are present for each square millimicron of silica surface. Thus an additional amount of surface active agent within the range preferred for the alkaline ionic silicate should be added for each mole of surface silanol groups present on the surface of the amorphous silica. The percentage of silanol groups on the surface of amorphous silica particles can also be calculated from the relationship that the percent of silanol groups of the surface is equal to $218/D$ where D is the average particle diameter in millimicrons.

The most preferred range for foaming agent will be in the range from 0.004 to 0.04 mole of surfactant per mole of total reactive silica—e.g., total alkaline ionic silicate plus total surface silanol groups of the colloidal silica.

One of the major advantages of the foamed compositions of this invention is that the foams are stable and shapeable for extended periods of time and even retain their foam structure upon drying. Thus these foams have particular utility in applications such as agricultural sprays and mine wall coatings where flexibility and stability are important properties. These foams possess other important properties; they are relatively non-toxic, inexpensive, non-flammable, and low in density.

Another advantage of the compositions of this invention is that it is possible to use the inherent reactivity of alkaline ionic silicates and their tendency to form rigid silica gel structures, to bring about a rapid setting or gelling reaction after the foam has been formed to the desired shape. Setting or gelling alkaline ionic silicate compositions and mixtures of such silicates with colloidal silica sols can be brought about by addition of an ionic gelling agent such as an acidic gas, an aqueous solution of an acid, or by means of the addition of an approximately neutral molecule or latent acid such as an ester which can furnish an acid by hydrolysis. In general, gelling may be brought about by any acidic material having an acid dissociation constant in excess of $10^{-10}$.

It is also possible to bring about gelation by the addition of ionizable salts or by the addition of nonionic latent salts such as formamide, which hydrolyze to give ionizable salts. The amount of additives required will vary with the concentration of the alkaline ionic silicate, with the ratio of silica to basic cations in the ionic silicate and to the rate of hydrolysis of the latent gelling agent where used. The amounts of gelling agent required will usually be in the range of 0.05 to 0.9 time, on an equivalent basis, of the total alkalinity of the silica-silicate mixture, the larger amounts being required for the latent gelling agents or for systems containing high concentrations of colloidal silica.

Instead of employing a latent gelling agent, an acidic gas may be employed. Thus one may use carbon dioxide or sulfur dioxide, for example. The surface areas of the foamed products of the invention are quite high and due to their light, porous structure, they can be quickly permeated by such gases. These acidic gases can then be absorbed and will react to neutralize the ionic silicate, thereby bringing about the setting or gelling of the overall foam composition.

A preferred class of nonionic gelling agents contains compounds which can be characterized as latent gelling agents. The compounds undergo hydrolysis reactions to release acidic or salt-forming materials. By this is meant neutral or non-ionized materials which will hydrolyze in aqueous solution to liberate an acidic or both an acidic and basic substance. Suitable compounds are amides, imides, esters, acid anhydrides, and other such materials. Such compositions can be derived either from organic acids or from inorganic acids. Thus it is possible to use the esters of phosphoric acid or the esters of acetic acid. Preferred compositions include formamide, ethyl acetate, 2-hydroxy etheyl acetate, the diacetate and triacetate esters of glycerol and, in general, water-soluble esters, amides and other compounds which hydrolyze in water to give ionic products either in the form of salts or in the form of free acids and a neutral hydrolysis product. Gellation by latent gelling agents may be hastened by heating the foamed article to temperatures in excess of 100° F.

When it is desired to neutralize the compositions of the invention by means of a latent acid, the acidic moiety in the starting ester, for example, should be more acidic than silicic acid. This will polymerize the ionic silica and promote setting of the foam. Acids with dissociation constants greater than $10^{-10}$ are suitable for this purpose.

It has been noted that latent salt-forming materials such as formamide, which hydrolyze to form ammonium formate, considerably enhance the foamability of the mixture. While the mechanism of this is not completely understood, it is believed that the high salt concentration achieved on hydrolysis of the latent salt is one of the changes which promotes the formation of silicate anion micelles which then react more strongly with the cation surfactant micelles than in the absence of the latent salt. Another destabilizing influence which is believed important is the reduction in dielectric constant of the medium caused by addition of the nonionic gelling agent which limits the use of hydrolyzable compounds having low dielectric constant. Hydrolysis of latent acids and latent salts can be accelerated after the mixture has been foamed, and mixed with particulate materials, by increasing the temperature of the reacting mixture.

Caution should be exercised in employing latent gelling agents such as ethylene carbonate, because, as referred to previously, it is possible to obtain too high a degree of polymerization before foaming is achieved. The deleterious effect of polymerization on foamability is thought to be due to the formation of three-dimensional polymers which can not easily orient into the required two-dimensional micellar aggregate structure between the surfactant cationic micelles and the silicate anionic micelles. In general, it is therefore desirable to foam the mixture before more than about 10% of the silicate anion has been polymerized.

Until such time as it is desired to set the compositions of the invention, and in any event until after the foam has been prepared, it is necessary to maintain the pH of the compositions in excess of 9. Generally, the pH will be between 10 and about 12.5, and this pH is the preferred range to operate. Lower pH's than this promote the polymerization of the alkaline silicate constituent of the compositions of the invention, and as noted above, if more than 10% of the silicate anions polymerize, the compositions of the invention will no longer foam satisfactorily.

Fillers useful in the invention

Various fillers can be incorporated into the foams. Representative of suitable fillers of the invention are particulate additives such as the various clays including the expanded clay aggregates, expanded perlite and vermiculite, pigmentary potassium titanate, and gypsum; and fibers such as plastic fibers, vegetable fibers such as paper pulp, bleached and unbleached wood pulp, glass fibers, metal fibers, ceramic fibers, mineral fibers such as asbestos, and synthetic inorganic fibers such as rock wool, slag wool, and the alumino-silicate fibers including "Fiberfrax" (Carborundum Co.), "Thermoflex" (Johns-Manville Co.), and "Kaowool" (Babcock and Wilcox Co.). Other suitable additives to the foams of this invention include materials which serve as binding agents such as polymers, including phenolformaldehyde and urea formaldehyde, as well as fugitive organic binders such as sugars, starches, resins, and gums. It should be emphasized that these materials may be included as long as they are compatible with the silicate compositions of this invention and may be desirable in certain instances, but that they are not necessary additives, since the alkaline silicate compositions of the invention are completely adequate in their binding capacity without assistance from such organic materials.

As previously noted, particulate materials may be included in amounts up to as much as 15 parts of such particulate additives based on the dry weight of the silicate foams of the invention. Somewhat smaller quantities than this are usually preferred, although, as indicated previously, suitable foams can be prepared even without any additives whatsoever. Thus, the allowable quantities of fillers may range from none to as much as 1500% of the dry weight of the foam binders of the invention.

Processes of the invention

In general, the processes of this invention will comprise mixing an aqueous solution of an alkaline ionic silicate with one of the cationic silicate-reactive surfactants of the invention, and, if desired, a latent gelant such as one of the latent salts or latent acids previously discussed. The composition can then be foamed by whipping or beating air or another suitable inert water-insoluble gas such as "Freon" into the solution and, depending upon the amount of acid or latent acid included, the composition will set even at room temperature. By use of an acid gas and by control of the temperature, the relative amounts of alkali silicate, acid and colloidal amorphous silica, it is possible to vary the set time over almost any desired range from a few seconds to a period of many hours. As noted above, when latent salts or latent acids are employed, it is possible to accelerate the set of compositions of this invention by increasing the temperature. Generally, heating beyond 200° F. is unnecessary.

It is one of the characteristics of the foams of this invention, especially those containing larger amounts of colloidal silica, that they are sufficiently stable that they can be mechanically worked, molded, pumped and otherwise manipulated to a considerable degree without any serious loss of the desired foam structure. Thus, it is possible to mix these foams after formation with particulate materials including finely divided refractory fibers, plate-like materials such as clays and the like, and finely divided powders of all sorts. This must, of course, be done prior to setting the foam.

A highly preferred procedure for setting the compositions of this invention is to do so by exposure of the foamed compositions to gaseous carbon dioxide. By means of this technique it is possible to set the compositions of the invention within a few seconds to a few minutes, depending on the thickness of the shape being set. These products treated with $CO_2$ are not only rigid materials having a high degree of strength, even though they have been neither dried nor heated, but also have a substantial degree of water-insensitivity. If it is desired to enhance still further the water-insensitivity of these compositions, this may be done by mixing one of the latent salts or acids previously described, such as formamide, with the compositions of the invention prior to foaming and setting with $CO_2$. Then upon aging, at room temperature or by moderate heating, further neutralization of the alkaline ionic silicate to amorphous silica will occur.

Alternatively, water-insensitivity can also be enhanced by the addition of compounds such as magnesium oxide, zinc oxide, fly ash, which is a calcium silicate, portland cement, asbestos, or finely divided alumino silicate clays, all of which form insoluble chemical bonds between the silicate and the additive of the type just described.

The foams of this invention, either in the wet stage, or after setting by contacting with an acidic gas or a suitable acid or latent acid or latent salt are characterized by the exceedingly fine-pored structure and by a very low density. Densities of the foams having no filler added may be as low as 3 to 10 lbs./ft.$^3$. By a suitable adjustment of the ratio of alkaline ionic silicate to the foaming surface-active agents of the invention and of the concentration of silica in the composition, as well as by control of the amount of agitation and thus of the air which is whipped into the foams, it is possible to achieve densities either in the wet or the dry state which ranges from about 3 to about 30 lbs./ft.$^3$. In those applications where it is not necessary for the compositions of the invention to bear heavy loads, and where it is desired to achieve the lowest possible value of thermal conductivity for purposes of thermal insulation, the lower density foams are preferred.

In applications in which substantial structural loads must be borne by the foamed products of the invention, higher densities are desirable. It should be noted, however, that even the upper limit of the density of the compositions of this invention represents very light weight bodies compared to the normal ceramic materials hitherto available.

It is, of course, also possible to alter the density of the bodies bonded by these foams by varying the density of the particulate materials which are incorporated into the foam. However, the density of the foams themselves following their formation will fall within the range hitherto described.

Another characteristic of the foams of the invention is the extremely small and uniform diameter of the bubbles of the foam. They will generally be of the order of no more than a millimeter in diameter and usually much less, especially in the wet state and the structure will be found to be substantially uniform. Various degrees of open-pored structure vs. closed-pore foam structure can be achieved by suitable control of the foaming process and of the relative proportions of the essential ingredients.

Because of the derivation of the foams of this invention from alkaline ionic silicate-containing mixtures, the foam products of the invention are characterized by very high specific surface areas. By this it is meant that the silica gel walls which comprise the foams after setting them either thermally or chemically will be composed of exceedingly fine particles interconnected into a rigid silica gel network. In general, the surface area will range between about 300 and 1000 m.$^2$/g. The foams of this invention will therefore be characterized by very interesting adsorptive properties. Thus they may be used as extremely light weight, high-surface-area supports for catalytically active materials which can be deposited on the foam after it has been prepared. Particulate catalysts may also be mixed in the foam before gelling or setting has been accomplished.

It is also the derivation of the foams of this invention from alkaline ionic silicate which is responsible for their high degree of binding power and for their ability to convert extremely light weight bodies either filled or unfilled into surprisingly strong structural materials. This represents a unique characteristic, in that all prior art efforts to foam silicates or to foam colloidal oxides have resulted in materials which have only limited utility as binders.

When suitably neutralized, as with latent acids, gaseous acids, such as $CO_2$, or aqueous acids, the compositions of this invention are quite water-resistant and refractory. If compositions having the ultimate in refractory properties are desired, it is preferred to use one of the organic silicates of the invention rather than one of the alkali metal silicates. It is also preferred in such circumstances to employ colloidal amorphous silica as a donating source of the major portion of the silica in the foams of the invention. On subsequent heating, the organic cation is decomposed and a pure silica foam structure results. Such amorphous silica does not melt below about 1600° C., and since it does not soften or devitrify rapidly at temperatures below about 1200° C., such pure amorphous silica foam binders achieve a highly useful combination of light weight, structural strength, water-insolubility, and a high degree of thermal refractoriness. Even the alkali metal silicate compositions of the invention can be quite refractory, since much of the alkali content is present in the form of a salt of the acidic material used to neutralize the silicate. Most of the walls of the foam are still composed of amorphous silica. If the maximum refractoriness is desired when starting with one of the less expensive alkali metal silicates of the invention, the foam can be extracted with water after acid setting to remove the salt by-product of the gelling or setting reaction. A much purer amorphous silica foam body can thereby be obtained.

Uses of the compositions of the invention

The compositions of this invention are useful in a variety of applications in which it is desired to obtain stable, shapeable foams which can, if desired, be converted into strong, very light weight, refractory, water-insoluble structural materials. Thus the compositions of the invention can be employed either with or without fillers of the type previously described to prepare wall board for structural applications, thermal insulation, insulation to decrease noise, and ceiling tile. Since the compositions of this invention can be prepared continuously from a foam generator, and since they can be set at either room temperature or at elevated temperatures, they can be applied in place, such as by spraying the surfaces to be covered with a blanket of the foam, followed by an appropriate setting reaction. The foams of this invention which have not been acid-set are also very useful for a variety of purposes. Thus they can be employed as light weight carriers with controlled-release properties for a variety of agricultural products. An example of this is the preparation of an agricultural mulch by the incorporation of suitable plant nutrients such as potassium phosphate, a source of nitrogen such as urea or ammonia, as well as herbicides, insecticides, fungicides, plant growth regulants and materials such as carbon black, to alter light absorption into the liquid mixture, and foaming into place into an appointed agricultural area. This very light weight, inexpensive mulch of water-insoluble silica containing the required nutrients will release them in a controlled manner over a long period of time.

The foams of this invention are also useful in fighting fires, since they are inorganic and contain only a small amount of combustible material. These foams being stable, inexpensive, and easily generated are suitable for mine wall coating to reduce mine dust levels. The foams both keep dust from sloughing off the mine walls and also trap dust from the air since they can remain unset and moist for long periods while still being light enough to adhere to mine walls without sloughing off. Many other applications will be readily apparent to those skilled in the art.

EXAMPLE 1

A five-quart Hobart mixer kettle is charged with two hundred parts of sodium silicate (8.9% $Na_2O$, 29.0% $SiO_2$, 62.1% $H_2O$; of specific gravity 41.6° Bé. at 60° F. and having an approximate viscosity of 250 cp. at 78° F.) and two parts of 50% hexadecyl trimethyl ammonium chloride (Armour Chemicals "Arquad" 16–50). Upon adding the surfactant, a white gel is produced. The two-phase system is blended for fifteen seconds with a wire-ship beater at low speed and then beat at high speed for six minutes to produce a stable, shapeable foam. The foam occupies a space three times greater than that of the starting sodium silicate. It has a density of 30 lbs./ft.$^3$ in this wet state. This foam is stable, without the addition of setting agents, for over eight hours and may be shaped at any time during this period provided it is not allowed to dry. The foam does not collapse even upon drying.

To the above foam was added 90 parts of ultra-fine expanded perlite having a density of 2.5 lbs./ft.$^3$. The mixture is blended for thirty seconds at low speed to produce a low density, viscous mass. This foam is also stable, without setting, for over eight hours. The foam may be used in this condition or it may be set by exposure to carbon dioxide gas. Specimens are molded and subjected to an atmosphere of carbon dioxide gas for a period of about five minutes. Specimens are air dried for 16 hours and then oven dried at a temperature of 50° C. for an additional 8 hours. A low density insulation composition is obtained by this procedure, and is characterized as follows:

| | |
|---|---|
| Density, lb./ft.$^3$ | 20 |
| Compressive strength, p.s.i. at 5% deformation | 110 |
| Lineal shrinkage on drying, percent | <1 |
| Water resistance, 8-hr. boil followed by 16-hr. immersion: | |
|    Loss in volume, percent | <0.5 |
|    Density, lb./ft.$^3$ | 15 |
|    Compressive strength, p.s.i. at 5% deformation | 40 |

EXAMPLE 2

The procedure of Example 1 is repeated except that sixty-five parts of water are added to the sodium silicate prior to its foaming. The foam expands abut five times the volume of that of the substituents and has a density of 16 lbs./ft.$^3$. The foam is blended with 150 parts of perlite as above. This foam is stable and shapeable for over four hours. The filled foam is processed as in Example 1 to give a shape which has the following properties:

| | |
|---|---|
| Density, lb./ft.$^3$ | 12.5 |
| Lineal shrinkage, percent | <1 |
| Compressive strength, p.s.i. at 5% deformation | 45 |
| Water resistance on boiling 8 hrs. followed by 16-hr. immersion: | |
|    Volume, percent loss | <0.5 |
|    Density, lb./ft.$^3$ | 11 |
|    Compressive strength, p.s.i. at 5% deformation | 25 |

EXAMPLE 3

With stirring, two hundred parts of sodium silicate (8.7% $Na_2O$:28.47% $SiO_2$:62.9% $H_2O$ of specific gravity 40.6° Bé. at 60° F. and having an approximate viscosity of 120 cp. at 78° F.) are blended with a mixture consisting of 25 parts of formamide and 60 parts distilled water. Ten parts of a 50% solution of hexadecyl trimethyl ammonium chloride are added and the mixture is blended for 30 seconds in a Hobart mixer kettle. Following this, the mixture is beaten for about three minutes with a wire-ship beater at maximum speed to produce a foam. To the foam is added 60 parts of mineral wool, 120 parts of ultra-fine perlite powder (2.5 lb./ft.$^3$ density) together with 60 parts of water. The filler is blended thoroughly into the foam using the same Hobart mixer and wire-ship beater. This foam is stable and remains shapeable for up to four hours at room temperature. Specimens are formed in a mold and subjected to an atmosphere of carbon dioxide gas for a period of about ten minutes.

A rapidly set low density insulation is obtained by this procedure, and is characterized as follows:

| | |
|---|---|
| Density, lb./ft.$^3$ | 21 |
| Compressive strength, p.s.i. at 5% deformation | 77 |
| Lineal shrinkage on drying, percent | <1 |
| Water resistance, 8-hr. boil followed by 16-hr. immersion: | |
|    Volume, percent loss | <0.5 |
|    Density, lb./ft.$^3$ | 17 |
|    Compressive strength, p.s.i. at 5% deformation | 56 |

EXAMPLE 4

The procedure of Example 3 is repeated using two hundred parts of sodium silicate (8.9% $Na_2O$:29.0% $SiO_2$:62.1% $H_2O$) of specific gravity 41.6° Bé. at 60° F. and having an approximate viscosity of 250 cp. at 78° F. This foam is stable and remains shapeable for up to four hours at room temperature.

As in Example 3, a quick-setting low density insulating product is obtained having the following balance of properties:

| | |
|---|---|
| Density, lb./ft.$^3$ | 21 |
| Compressive strength, p.s.i. at 5% deformation | 144 |
| Lineal shrinkage on drying, percent | <1 |

EXAMPLE 5

Two hundred parts of sodium silicate (8.7% $Na_2O$: 28.47% $SiO_2$:62.9% $H_2O$) are blended with a mixture of 25 parts formamide and 60 parts water. Ten parts of a 50% solution of hexadecyl trimethyl ammonium chloride are added and the mixture is blended for 30 seconds in a Hobart mixer kettle. Following this, the mixture is beat for three minutes with a wire-ship beater at maximum speed to produce a foam. To the foam are added 15 parts "Fiberfrax" ceramic fiber and a blend of fillers including 75 parts of ultra-fine perlite powder (2.5 lb./ft.$^3$) and 150 parts "Veri-lite" expanded refractory clay particulate aggregate. The fillers are uniformly mixed throughout the foam binder matrix using the same Hobart mixer and wire-ship beater. This foam is stable and remains shapeable for up to four hours at room temperature. Specimens are molded and then allowed to dry thoroughly in air.

A hard, strong, tough refractory insulating material is thus produced having the following properties:

| | |
|---|---|
| Density, lb./ft.$^3$ | 28 |
| Compressive strength, p.s.i. at 5% deformation | 144 |
| Lineal shrinkage on drying, percent | <1 |

Similar results are obtained when about 75 parts of the triacetate ester of glycerol is substituted for the formamide.

EXAMPLE 6

With stirring, two hundred parts of sodium silicate (8.9% $Na_2O$:29% $SiO_2$:62.1% $H_2O$) are blended with 60 parts water and 60 parts of mineral wool (White Tile Grade). Ten parts of a 50% solution of oleyl-linoleyl trimethyl ammonium chloride are first slowly blended therein followed by a rapid whipping in a Hobart mixer kettle using a wire-ship beater. Following this, 120 parts of ultra-fine perlite powder (2.5 lb./ft.$^3$ density) together with 60 parts water are blended into the foam using the same mixing equipment. This foam is stable and shapeable for over six hours.

A portion of this foam is set by exposure to carbon dioxide gas.

By this procedure, a low density quick-setting insulating product is obtained that develops 30 lb./in.$^2$ compressive strength at 5% deformation within a ten-minute period after foaming, and is further characterized below:

| | |
|---|---|
| Density, lb./ft.$^3$ | 13.5 |
| Compressive strength, p.s.i. at 5% deformation | $^1$ 50 |
| Lineal shrinkage on drying, percent | <1 |

$^1$ Ultimate.

EXAMPLE 7

The procedure of Example 3 is repeated using two hundred parts of potassium silicate (12.45% $K_2O$:26.25% $SiO_2$:61.30% $H_2O$ of specific gravity 40.5° Bé. at 60° F. and having an approximate viscosity of 325±75 cp. at 77° F.), instead of the sodium silicate in Example 3. Prior to setting with carbon dioxide, this foam is stable and remains shapeable for up to four hours at room temperature.

As in Example 3, a rapidly-set low-density insulation material is obtained that is characterized as follows:

| | |
|---|---|
| Density, lb./ft.$^3$ | 15 |
| Compressive strength, p.s.i. at 5% deformation | 54 |
| Lineal shrinkage on drying, percent | <1 |

EXAMPLE 8

The procedure of Example 3 is repeated using 7.68 parts of 7 N ammonium formate solution in water and 78 parts water as a replacement for the 25 parts formamide and 60 parts of water. The ammonium formate solution is added dropwise with good agitation to the 200 parts of sodium silicate (8.9% $Na_2O$:29% $SiO_2$:62.1% $H_2O$) diluted with 78 parts of water. Without heating, three parts of beta-pentadecyl trimethyl ammonium chloride are added and the mixture is beaten as previously described. A filler mixture consisting of 50 parts of ultrafine perlite powder (2.5 lb./ft.$^3$) and 50 parts of coarse perlite grains (7 lb./ft.$^3$ density and 8–20 mesh size) is blended into the foam. This foam is shapeable for up to four hours at room temperature. Specimens are formed in a mold and immediately exposed to an atmosphere of carbon dioxide gas for a period of about ten minutes.

A fast-set insulation product is obtained by this procedure that is characterized as follows:

| | |
|---|---|
| Density, lb./ft.$^3$ | 24 |
| Compressive strength, p.s.i. at 5% deformation | 160 |
| Lineal shrinkage on drying, percent | <1 |

EXAMPLE 9

The procedure of Example 3 was repeated, employing the following silicate: 290 parts of guanidine silicate solution of 3.06 molality (0.924 mol ratio guanidine to silica: 39.6% solids:20.2% silica). As in Example 3 the silicate solution was foamed and filled with perlite to give a stable, shapeable foam.

EXAMPLE 10

Example 9 was repeated except the formamide was not added. Also the heating step was omitted. As before the foam was blended with perlite to give a stable, shapeable foam.

EXAMPLE 11

Three hundred parts of lithium silicate (4.8 $SiO_2$:1 $Li_2O$ on a mole basis at 22% solids) are blended with a mixture consisting of 25 parts of formamide (Technical Grade) and 60 parts of water. Ten parts of a 50% solution of hexadecyl trimethyl ammonium chloride are added and the mixture is blended then beat in a Hobart mixer kettle to obtain a foam. A filler mixture consisting of 60 parts ultra-fine perlite, 60 parts mineral wool and 60 parts fly ash is blended into the foam. This foam is shapeable for four hours at room temperature. Samples molded from this composition and air dried are characterized as follows:

| | |
|---|---|
| Density, lb./ft.$^3$ | 23 |
| Compressive strength, p.s.i. at 5% deformation | 60 |
| Lineal shrinkage on drying, percent | <1 |

EXAMPLE 12

With stirring, 150 parts of potassium silicate and 50 parts of a sodium stabilized colloidal silica aquasol containing 30% silica of an average particle size of 15 m$\mu$, and having a pH of 9.8 and a $SiO_2$ to $Na_2O$ weight ratio of 95:1 are blended with 60 parts water. Ten parts of a 50% solution of hexadecyl trimethyl ammonium chloride are added and the mixture is whipped in a Hobart mixer kettle to produce a foam. To the foam are added 120 parts of ultra-fine perlite powder (2.5 lb./ft.$^3$) and 60 parts of mineral wool together with 60 parts water. This foam is stable and shapeable for over six hours. It can even be dried without collapsing the foam.

EXAMPLE 13

Two hundred parts of sodium as in Example 4 were diluted with seventy-five parts water and 5.1 g. of a 50% solution of dodecyl trimethyl ammonium chloride was added. This mixture was beat at maximum speed in a Hobart mixer using a wire beater for one minute, giving a very voluminous foam. Twelve parts of a 50% aqueous solution of ethylene carbonate were then added as an internal acid source and beating was continued for two minutes causing further expansion and stiffening of the foam. This foam is shapeable for up to four hours at room temperature. A molded cylinder of this foam has a wet density of 0.175 g./ml. This foam cylinder on air-drying retained its shape with no bleeding or collapse and was strong and uniformly fine-grained.

EXAMPLE 14

Two hundred parts of a sodium silicate as in Example 4 were diluted with seventy-five parts water and thirteen parts of oleyl-linoleyl trimethyl ammonium chloride were added. This mixture was beat at maximum speed in a Hobart mixer using a wire beater for 12 minutes to produce a moderately wet soft foam. Twelve parts of a 50% aqueous solution of ethylene carbonate were then added and beating continued for five minutes. This foam was shapeable for up to four hours at room temperature. A cylinder was molded having a wet bulk density of 0.34 g./ml. On drying in air, the cylinder showed slight shrinkage and flattening but showed no bleeding of liquid, indicating it would be of value as a low density binder.

EXAMPLE 15

To 299 parts of sodium silicate, containing 25.3% $SiO_2$ and having an $SiO_2:Na_2O$ weight ratio of 3.75:1, were added 56 parts water and 6 parts of a 50% hexadecyl trimethyl ammonium chloride solution. The mixture was beat at maximum speed in a Hobart mixer with a wire beater for ten minutes giving a relatively soft voluminous foam. This foam remained shapeable for up to four hours at room temperature. A cast cylinder of this foam, having a wet density of 0.21 g./ml. was allowed to air dry during which time no collapse or bleeding was observed.

EXAMPLE 16

Into a five-quart Hobart mixing kettle is charged 175 parts of sodium silicate (8.9% $Na_2O$:29.0% $SiO_2$:62.1% water: of specific gravity 41.6° Bé. at 60° F. and having an approximate viscosity of 250 cp. at 78° F.), 12.5 parts water and 12.5 parts "Ludox" HS (a sodium stabilized colloidal silica aquasol containing 30% silica of an average particle size of 15 millimicrons and having a pH of 9.8 and a $Na_2O$ to $SiO_2$ weight ratio of 1:95). This mixture is stirred for 15 seconds at slow speed. Then three parts of a 50% solution of hexadecyl trimethyl ammonium chloride were mixed at high speed with a wire-ship beater for six minutes. The resulting foam occupies a space five times that of the substituents and has a density of 16 lbs./ft.³. The foam is shapeable for up to eight hours, has good stability and can be used in many binder applications.

EXAMPLE 17

The procedure of Example 16 is repeated, except that 150 parts of sodium silicate and 50 parts of "Ludox" HS are foamed. The foam is filled with 110 parts of ultra-fine perlite by blending in a Hobart mixer for 30 seconds to give a filled foam which is shapeable for up to four hours.

EXAMPLE 18

Example 16 is repeated except that 100 parts of sodium silicate and 100 parts of "Ludox" AS (an ammonia stabilized silica sol having an average particle size of about 13 m$\mu$) are employed. The foam is filled and processed according to Example 17 to give a stable, shapeable foam.

EXAMPLE 19

A foam having a ratio of 95% silica to 5% silicate was prepared using a five-quart Hobart mixer and a wire-ship beater. Two hundred parts of "Ludox" HS (a sodium stabilized colloidal silica aquasol containing 30% silica of an average particle size of 15 m$\mu$ and having a pH of 9.8 and a $Na_2O$ to $SiO_2$ weight ratio of 1:95) are mixed with ten parts of potassium silicate having a $SiO_2$ to $K_2O$ weight ratio of 2.5:1 at a density of 10.5 lbs./gal. These two ingredients are mixed for 15 seconds at low speed in the Hobart mixer. Three parts of a 50% solution of trimethyl hexadecyl ammonium chloride are added to the mixture and beat for two minutes at high speed. The resulting foam has a wet density of 11.5 lb./ft.³. After beating for an additional eight minutes, a foam density of 14 lb./ft.³ resulted. A very stable, shapeable foam was obtained, which could be worked easily and filled to produce low-density thermal insulation materials.

What is claimed is:

1. A stable shapeable aqueous foam composition having a pH of at least 9 and a silica concentration calculated as $SiO_2$ of at least 8% by weight which comprises (a) at least one dissolved, alkaline ionic silicate selected from the group consisting of lithium silicate, sodium silicate, potassium silicate and silicates of monovalent organic bases which base has a basic dissociation constant at 25° C. greater than $10^{-2}$, said dissolved silicates being considered as reactive silica; (b) a colloidal silica having an average particle size of about 5 to 200 millimicrons and amount of reactive surface silica as determined by the formula $S=0.08A=218/D$ where S is the percent of the total colloidal silica which is on the surface and available for reaction, A is the specific surface area of the colloidal silica in square meters per gram and D is the average diameter of the colloidal silica particles in millimicrons; and (c) the reaction product between said dissolved ionic silicates, colloidal silica and from 0.002 to 0.05 mole per mole of reactive silica of a surface active, cationic, nitrogen-containing "onium" compound having at least one but no more than two alkyl hydrocarbon chains of 8–24 carbon atoms, said composition having a mole ratio of colloidal silica to silicate ion of 0:1 to 99:1.

2. A composition as in claim 1 where the mole ratio of colloidal silica to alkaline ionic silicate is 0:1 to 50:1.

3. A composition as in claim 1 where the mole ratio of said colloidal silica to alkaline ionic silicate is 0:1.

4. A composition as in claim 1 where the mole ratio of colloidal silica to alkaline ionic silicate is 1.5:1 to 50:1.

5. A composition as in claim 1 where the average particle size of said colloidal silica is 5 to 50 millimicrons.

6. A composition as in claim 1 which contains an ionic gelling agent the anion of which comes from an acid which has an acid dissociation constant in excess of $10^{-10}$ and is present in amounts of 0.05 to 0.9 times on an equivalent basis of the total alkalinity of said mixture.

7. A composition as in claim 6 in which the gelling agent is carbon dioxide which forms carbonic acid in said aqueous composition.

8. A composition as in claim 1 which contains a latent, non-ionic gelling agent which on hydrolysis forms an ionizable compound.

9. A composition as in claim 8 where said latent gelling agent is formamide, ethyl acetate, 2-hydroxyethyl acetate, the diacetate ester of glycerol or the triacetate ester of glycerol.

10. A composition as in claim 1 which contains up to 15 parts of dry weight of said foam of an inert particulate or fibrous filler.

11. A foamed composition of claim 1 having a density of 3 to 10 lb./ft.³.

12. A process for preparing silica foams having a silica concentration of at least 8% by weight which comprises mixing and foaming an inert gas and an aqueous system of pH greater than 9 which contains (a) at least one dissolved ionic silicate selected from the group consisting of lithium silicate, sodium silicate, potassium silicate and silicates of monovalent organic bases which base has a basic dissociation constant at 25° C. greater than $10^{-2}$, said dissolved silicates being considered as reactive silica; (b) a colloidal silica having an average particle size of about 5 to 200 millimicrons and an amount of reactive surface silica as determined by the formula $$S=0.08A=218/D$$

where S is the percent of the total colloidal silica which is on the surface and available for reaction, A is the specific surface area of the colloidal silica in square meters per gram, and D is the average diameter of the colloidal silica particles in millimicrons; and (c) from 0.002 to 0.05 mole per mole of reactive silica of a surface active cationic nitrogen-containing "onium" compound having at least one but no more than two alkyl hydrocarbon chains of 8–24 carbon atoms, where the mol ratio of said colloidal silica to silicate ion is from 0:1 to 99:1.

13. A process as in claim 12 where said foam is dried.

14. A process as in claim 12 where said foam is contacted with an ionic gelling agent the anion of which comes from an acid having an acid dissociation constant in excess of $10^{-10}$ and is present in amounts of 0.05 to 0.9 times on an equivalent basis the total alkalinity of said mixture and then said foam is dried.

15. A process as in claim 14 where said gelling agent is an acidic gas.

16. A process as in claim 15 where said gas is carbon dioxide.

17. A process as in claim 14 where said gelling agent is a latent non-ionic gelling agent which on hydrolysis forms an ionizable compound.

18. A process as in claim 17 where said latent gelling agent is formamide, ethyl acetate, 2-hydroxyethyl acetate, the diacetate ester of glycerol or the triacetate ester of glycerol.

19. A process as in claim 12 where up to 15 parts of a filler per part of the dry weight of the foam is added and the filled foam is shaped and dried.

References Cited
UNITED STATES PATENTS

| | | | |
|---|---|---|---|
| 3,136,645 | 6/1964 | Dess | 106—75 |
| 3,475,375 | 10/1969 | Yates | 106—75 |

JAMES E. POER, Primary Examiner

U.S. Cl. X.R.

106—110 R; 252—67

UNITED STATES PATENT OFFICE
CERTIFICATE OF CORRECTION

Patent No. 3,725,095　　　　　　　Dated April 3, 1973

Inventor(s) Verne Wesley Weidman and Paul C. Yates

It is certified that error appears in the above-identified patent and that said Letters Patent are hereby corrected as shown below:

Column 16, line 1, --an-- should be inserted before "amount".

Column 16, line 24, "gclIng" should be --gelling--.

Column 16, line 39, --per part-- should be inserted after "15 parts".

Signed and sealed this 23rd day of October 1973.

(SEAL)
Attest:

EDWARD M. FLETCHER, JR.
Attesting Officer

RENE D. TEGTMEYER
Acting Commissioner of Patents